(12) United States Patent
Shaklee

(10) Patent No.: US 6,483,608 B1
(45) Date of Patent: Nov. 19, 2002

(54) PHOTOGRAPHIC PROCESS PRINTER WITH GRADED INDEX LENS

(75) Inventor: Kerry L. Shaklee, Brighton, CO (US)

(73) Assignee: Sienna Imaging, Inc., Englewood, CO (US)

( * ) Notice: Subject to any disclaimer, the term of this patent is extended or adjusted under 35 U.S.C. 154(b) by 0 days.

(21) Appl. No.: 09/397,378

(22) Filed: Sep. 16, 1999

(51) Int. Cl.[7] .............. G06F 15/00; H04N 1/46; G02F 1/13; G02F 1/1335
(52) U.S. Cl. .............. 358/1.9; 358/512; 349/2; 349/62
(58) Field of Search .............. 358/1.9, 1.1, 1.7, 358/1.8, 1.12, 1.18, 509, 512, 520, 527, 535, 501; 349/2, 62, 63, 71

(56) References Cited

U.S. PATENT DOCUMENTS

| | | | |
|---|---|---|---|
| 4,447,126 A | * | 5/1984 | Heidrich et al. ......... 350/96.31 |
| 4,852,982 A | * | 8/1989 | Yamamoto et al. ......... 350/413 |
| 5,032,911 A | * | 7/1991 | Takimoto ..................... 358/76 |
| 5,151,718 A | * | 9/1992 | Nelson ....................... 346/160 |
| 5,504,514 A | * | 4/1996 | Nelson ....................... 347/130 |
| 5,504,598 A | * | 4/1996 | Sprague et al. ............... 359/41 |
| 5,828,356 A | | 10/1998 | Stoller |
| 5,864,390 A | | 1/1999 | Johnson et al. |

* cited by examiner

Primary Examiner—Madeleine Nguyen
(74) Attorney, Agent, or Firm—James R. Young

(57) ABSTRACT

A color printer that conducts an image from a surface of a CRT through a graded index lens to expose media. The CRT is mounted at an acute angle with respect to the media, to compensate for the graded index lens focusing different colors at different distances. The graded index lens is placed at a center of the acute angle. The CRT may have different phosphor stripes on the face of the CRT for each color being exposed or the CRT may have a white phosphor throughout the entire exposure area of the CRT and utilize color filters to create each color being exposed.

27 Claims, 6 Drawing Sheets

PHOTOGRAPHIC PROCESS PRINTER WITH GRADED INDEX LENS

FIELD OF THE INVENTION

This invention relates to printers for computer systems and more particularly to Cathode Ray Tube (CRT) exposure systems within such printers. Even more particularly, the invention relates to using a graded index lens array to conduct light from the surface of a CRT to expose photosensitive media.

BACKGROUND OF THE INVENTION

Digital photographic process printers that utilize cathode ray tubes (CRT's) for media exposure typically expose the photographic media line by line directly from the face of the CRT or through fiber optics. That is, the light from each element, or pixel, on the face of the CRT is conducted to the media directly, through a conventional lens, or through a fiber optic face plate. The interior surface of the face plate typically has three phosphor stripes or bands; one for red, one for green, and one for blue, for the three color components that make up the elements. The controller for the CRT uses linear deflection amplifiers to select a phosphor and sweep an electron beam across one phosphor on the face of the CRT to expose one line on the media to one color at a time. This exposes the media in a deflection cycle that typically consists of a sweep, retrace, and hold period. During the sweep period, the CRT electron beam is unblanked and the beam is driven horizontally at a given vertical position while being intensity modulated to expose the media to the correct amount light at each location on the line of the media. The particular color being exposed is determined by the vertical position of the electron beam on the face of the CRT. To correctly expose each line of the media to each color, the media, or the CRT, is moved as each color is selected and exposed.

In prior art systems, the image is conducted from the CRT to the media being exposed by a fiber optic array that forms the faceplate of the CRT. The fiber optic array requires that the media be in close proximity during exposure. This can lead to image artifacts due to dirt on the fiber optics or scratching.

Graded Index (GRIN) lenses are known in the art. One embodiment of the GRIN lens is the SelFoc lens manufactured by NSG America, Inc. of Somerset N.J. These lenses are cylindrical, and made of glass. Glass rods are first drawn, and then baked in an oven with chemicals that diffuse into the glass. As the chemicals diffuse into the glass, they reduce the index of refraction of the glass so that the index of refraction varies across the diameter of the lens, causing light passing through the lens to bend around inside the lens.

By comparison, a conventional lens uses the geometry of the surface of the lens to focus the image. That is, the light rays are bent as they pass from air into the lens and also bent as they pass from the lens back into air, because the index of refraction is different between air and the lens material. Within the conventional lens, however, the light rays travel in a straight line since the index of refraction is constant within the conventional lens.

Because the index of refraction varies within the graded index lens, the graded index lens focuses the image internally to the lens. As the image is focused within the lens, it travels in a sinusoidal pattern which causes the image to be oriented in various directions at various locations within the lens. The graded index lens thus has a pitch that determines the orientation of the image. With a lens having a pitch of 0.5, the lens will conduct the image from one end to another and invert the image, as with a conventional lens. With a lens having a pitch of 1, the lens will conduct an image from one end to another and keep the image oriented in the same direction, as would occur with two normal lenses successively coupled.

An advantage of the graded index lens is that it does not have to be bonded to the face of the CRT. A disadvantage of the graded index lens is that it focuses different wavelengths of light (i.e. different colors) at different distances, thus causing chromatic aberration in color images conducted to the photosensitive media. This disadvantage does not affect conventional uses for the lens, such as FAX machines or laser printers, which use monochromatic light to expose the media. However, when used to focus color light, the chromatic aberration of the lens causes a partial defocusing to occur for some colors, depending upon the distance between the image and the media. Thus in the past the use of graded index lenses has been sub-optimal for color printers.

Another advantage of applying a graded index lens to a printer is that the medium does not come into contact or near contact with the surface of the lens array during exposure, thereby greatly reducing the susceptibility to image artifacts due to dirt in the optical path or scratching due to paper contacting the face plate.

There is a need in the art for an apparatus and method for using a graded index lens with color printers. There is a further need for a method and apparatus for overcoming the problem of different colors focusing at different points. The present invention meets these and other needs in the art.

SUMMARY OF THE INVENTION

It is an aspect of the present invention to correct the focus of an image being conducted from a face of a CRT through a graded index lens to photosensitive media being exposed by the image.

It is another aspect of the invention to place a face of the CRT at an acute angle to the media being exposed by the image to compensate for chromatic aberration.

Another aspect of the invention is to place the graded index lens at a center of the acute angle, thus the optical distance between the inner CRT face and an inside surface of the lens is equal to the optical distance between the outside surface of the lens and the media being exposed.

A further aspect of the invention is to place at least one color filter between the CRT and the media.

A still further aspect of the invention is to place the color filter on a surface of the CRT.

Still another aspect of the invention is to use a plurality of graded index lenses, one for each color filter.

Yet another aspect of the invention is to compensate for chromatic aberration by placing different materials or thicknesses of materials in the optical paths of the three color channels to adjust the conjugate distance of each color for best focus.

The above and other aspects of the invention are accomplished in a system that optically conducts an image formed on the inner surface of a CRT face plate through a graded index lens to the photosensitive media being exposed. The optical distance between the inner CRT surface (the object) and the Media (the image) is called the Total Conjugate (TC), and different colors focus at different TC distances between the surface and the media. Because of this, if the surface of the CRT is parallel to the media, one or more colors of the image will not focus correctly on the media. The present invention places the face of the CRT at an acute angle with respect to the surface of the media to correct for the TC distance needed for various colors. The graded index lens is placed at a center of the acute angle such that the optical distance between the face of the CRT and a near surface of the graded index lens is equal to the distance between a far surface of the graded index lens and the media, at each location on the surface of the graded index lens.

One embodiment of the present invention uses a different phosphor stripe on the face of the CRT to create each color being exposed. A separate graded index lens array is placed between each phosphor stripe and the media.

A second embodiment uses a CRT having a white phosphor throughout the entire exposure area of the CRT and utilizes color filters to create each color being exposed. The color filters may be placed on a surface of the CRT, on a near surface of the graded index lens, on a far surface of the graded index lens, or adjacent to the media. A separate graded index lens array is placed between each color filter and the media.

Another embodiment uses a single large graded index lens array to span across all phosphor stripes or all color filters.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
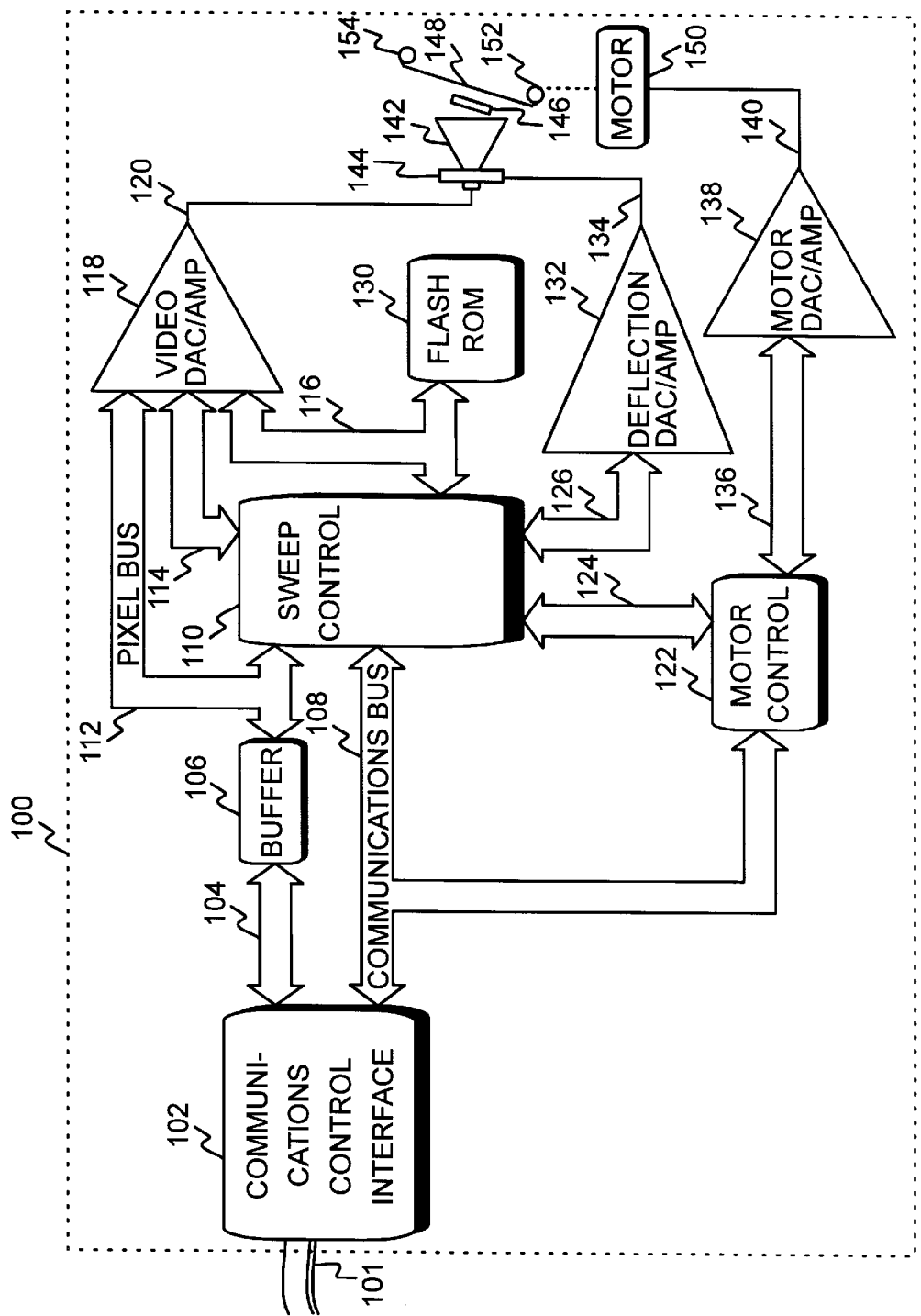
FIG. 1 shows a block diagram of the CRT Printer of the present invention, and illustrates the angle between the CRT and media.

FIG. 1 shows a block diagram of the essential elements of a printer 100 incorporating the method and apparatus of the present invention. Referring now to FIG. 1, communications control interface 102 receives image data from a host computer system (not shown) over host interface 101. The image data received is reproduced on photosensitive media 148 by displaying horizontal image elements, also called pixels, of each row of the image on a CRT 142, which is separated from the photosensitive media 148 by a graded index lens array 146. Photosensitive media 148 may be either positive or negative photosensitive media, such as photographic paper, Cycolor media, Acid Amplifier media, etc.

Those skilled in the art will recognize that image illumination devices other than a CRT could be used to produce the image. For example, an array of Light Emitting Diodes could also be used to produce the image.

The image elements are optically projected from the CRT and combined on the media 148, one row at a time, as media 148 is moved past the CRT, until all rows of the image have been reproduced as a latent image on media 148. Media 148 is then moved on to a development process (not shown) to develop and fix the latent image. Those skilled in the art will recognize that the invention will also work with media that does not require development after exposure. Those skilled in the art will also recognize that the CRT could be moved over a fixed media to expose each row of the image.

Data received by the communications control interface 102 is stored in a buffer 106 and conducted to a video DAC/Amplifier 118 before being used to control the intensity of CRT 142. Light created when the electron beam strikes the phosphor of CRT 142 is conducted through a graded index lens array 146 to expose media 148. Media 148 is photosensitive, recording the image data displayed on CRT 142 and conducted through graded index lens array 146. Graded index lenses and graded index Lens Arrays suitable for use with the present invention are manufactured by NSG America, Inc. Somerset, N.J. 08873 under the trade name SelFoc.

During the printing process, deflection of the electron beam of CRT 142 is controlled by a CRT sweep control system 110. In the preferred embodiment of the invention, electron beam deflection of CRT 142 is controlled magnetically by a CRT yoke 144, having a CRT vertical deflection winding and a CRT horizontal deflection winding. These windings are driven by output signal 134 from deflection DAC/Amplifier 132, which is controlled by sweep control 110. Deflection of the electron beam may also be controlled electrostatically by sending output signal 134 to a CRT having electrostatic plates instead of a magnetic yoke.

CRT sweep control system 110 controls the start of each horizontal sweep, and communicates the beginning of active data that will expose media 148 to Video DAC/Amplifier 118 through signal 114.

Media 148 is moved by media rolls 152 and 154 which are powered by a motor 150. Motor 150 is operated by a motor control 122 and motor DAC/Amplifier 138. Those skilled in the art will recognize that instead of moving the media, the CRT could be moved over a fixed media to expose the media.

FIG. 1 illustrates that the CRT 142 is mounted at an acute angled with respect to the media 148 such that the distance between a portion of the CRT 148 that emits a first color, for example red, and the media area where the first color is focused is different from the distance between a portion of the CRT 148 that emits a second color, for example blue, and the media area where the second color is focused. Mounting the CRT 142 at an acute angle compensates for chromatic aberration wherein the graded index lens array 146 focuses the different colors at different distances. The optical distance between the CRT and the media is called the Total Conjugate, or TC. Because of the optical characteristics of the face plate of the CRT, and any other optical elements between the image formed on the inner surface of the CRT and the media, the optical distance between the inner surface of the CRT and the media is not the same as the physical distance between them.

Figure 2:
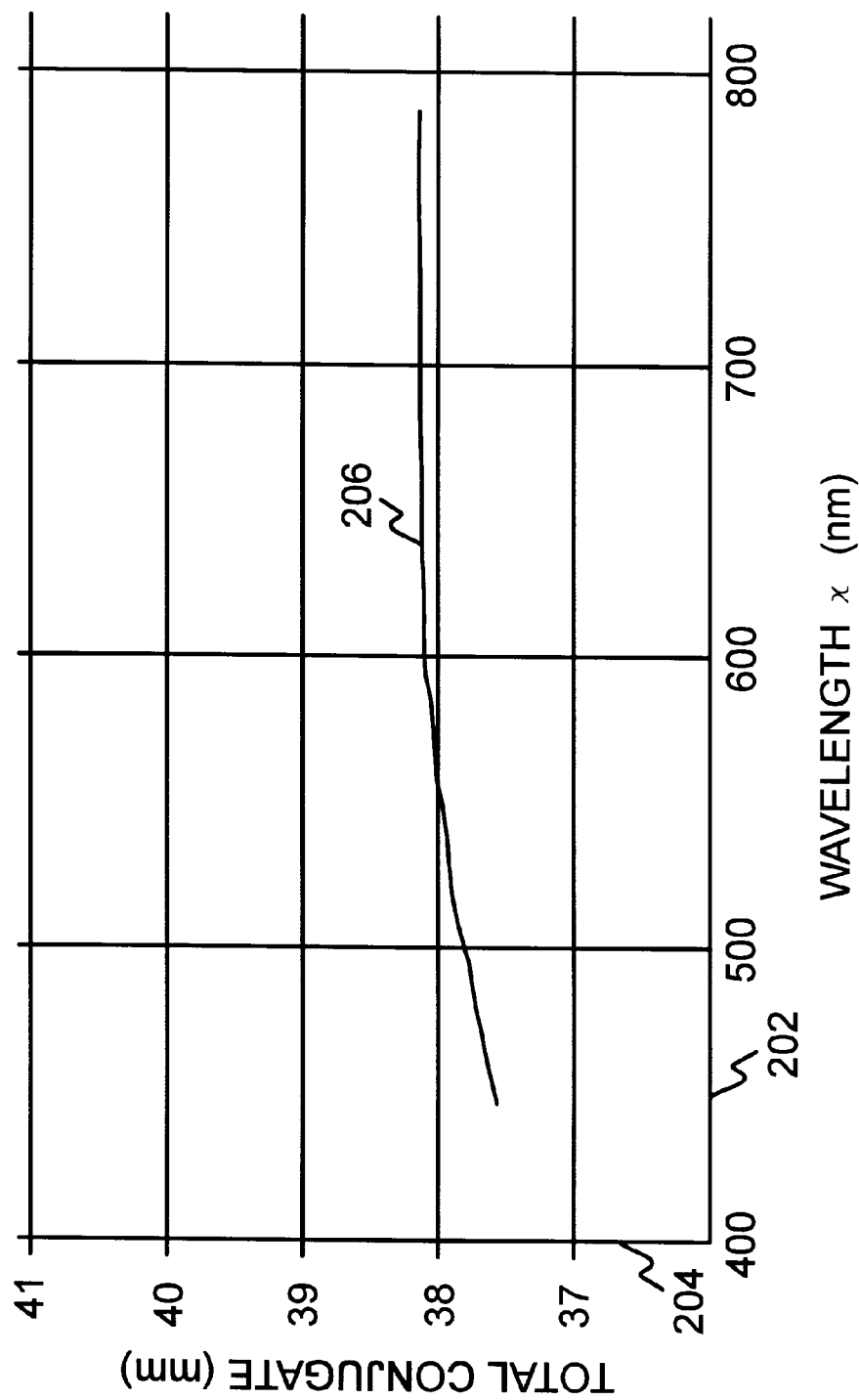
FIG. 2 shows a chart of the Total Conjugate for various wavelengths of light.

FIG. 2 shows a diagram of the Total Conjugate optical distance between the face of the CRT (the object) and the media (the image) as a function of the wavelength of the light. Referring to FIG. 2, Axis 202 shows the wavelength of light and axis 204 shows the Total Conjugate (TC), which is the optical distance between the inner face of the CRT 142 (FIG. 1) and the media 148 (FIG. 1). Line 206 shows the relationship between the light wavelength and the TC. In the present invention, the wavelengths of light used are approximately 430 nm for the blue light, 530 nm for green, and 670 nm for red. From FIG. 2, it can bee seen that for blue light (430 nm) the TC is approximately 37.5 mm, for green light (530 nm) the TC is approximately 37.9 nm and for red light (670 nm) the TC is 38.25 nm. Because the TC is different for the three colors, the face of the CRT 142 cannot be parallel to the media 148 and have all colors correctly focused at the media 148.

Figure 3:
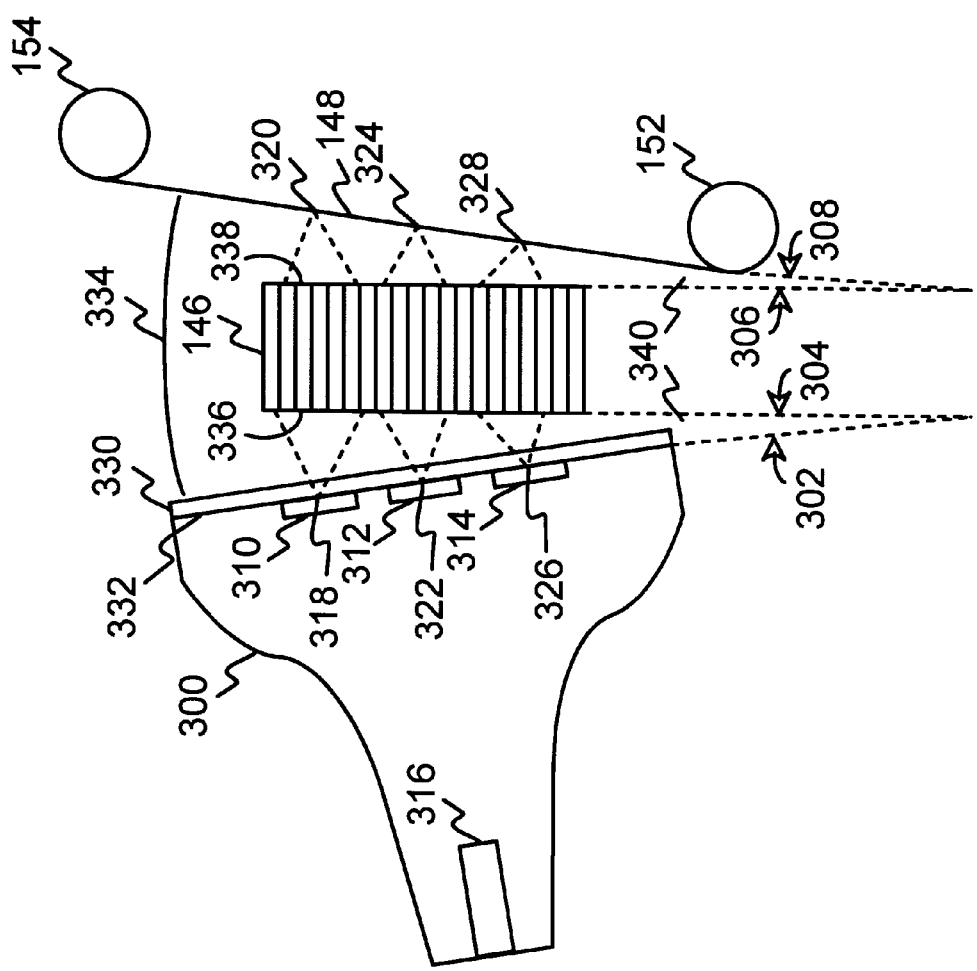
FIG. 3 shows one embodiment of the present invention wherein the face of the CRT is angled with respect to the media and further wherein different color phosphors are present on an inside surface of the face of the CRT.

FIG. 3 shows one embodiment of the present invention wherein different color phosphors are used on the inside the face of the CRT to generate the different color components necessary to form a color image on the media. Referring to FIG. 3, a CRT 300 is shown having an electron gun 316 used to activate phosphors on a face 330 of the CRT 342. A red phosphor 310 is shown located on an inside surface 332 of the face 330 of the CRT 342. Similarly green phosphor 312 and blue phosphor 326 are also located on the inside surface 332 of the CRT 300.

A line 302 extends from the inside surface 330 of the CRT 300 and a line 304 extends from an inside surface 336 of the graded index lens array 146. Similarly, a line 306 extends from the outside surface 338 of the graded index lens array 146 and a line 308 extends from the surface of the media 148. The angle 334 between lines 302 and 308 is chosen such that the TC is optimal for the red light emitted from a point 318 on the surface 330 and impacting the media at point 320; the TC is optimal for the green light emitted from a point 322 on the surface 330 and impacting the media at point 324; and the TC is optimal for the blue light emitted from a point 326 on the surface 330 to impact the media at point 328. In the present invention, this angle is approximately 4.35 degrees.

Placing the graded index lens array 146 at the optical center of the angle 334 causes the light to travel through the same optical distance between the inner surface of the face 330 of the CRT and the inside surface 336 of the graded index lens array 146 as the light travels between the outside surface 338 of the graded index lens and the media 148. Because of the index of refraction of the material used for the face plate of the CRT, the optical center of the angle 334 may not be the same as the physical center. If LEDs are used instead of the CRT, then the optical center and the physical center would be the same, since there is no face plate in the optical path.

One advantage of the graded index lens is that it need not be mounted to the surface of the CRT. Since a space exists between the CRT surface and an inside surface of the graded index lens, color filters can be mounted in this space. This allows the CRT to utilize a white phosphor throughout the surface of the CRT, and color selection is performed by using color filters at desired locations between the CRT and the media. The filters can be located anywhere between the CRT face and the media, such as being mounted to the face of the CRT, being mounted to the inside surface of the graded index lens nearest the CRT, being mounted to the outside surface of the graded index lens nearest the media, or being mounted adjacent to the media being exposed. In the preferred embodiment, the filters are mounted at the inside surface of the graded index lens to minimize the impact of scratches and dirt on the filters.

Figure 4:
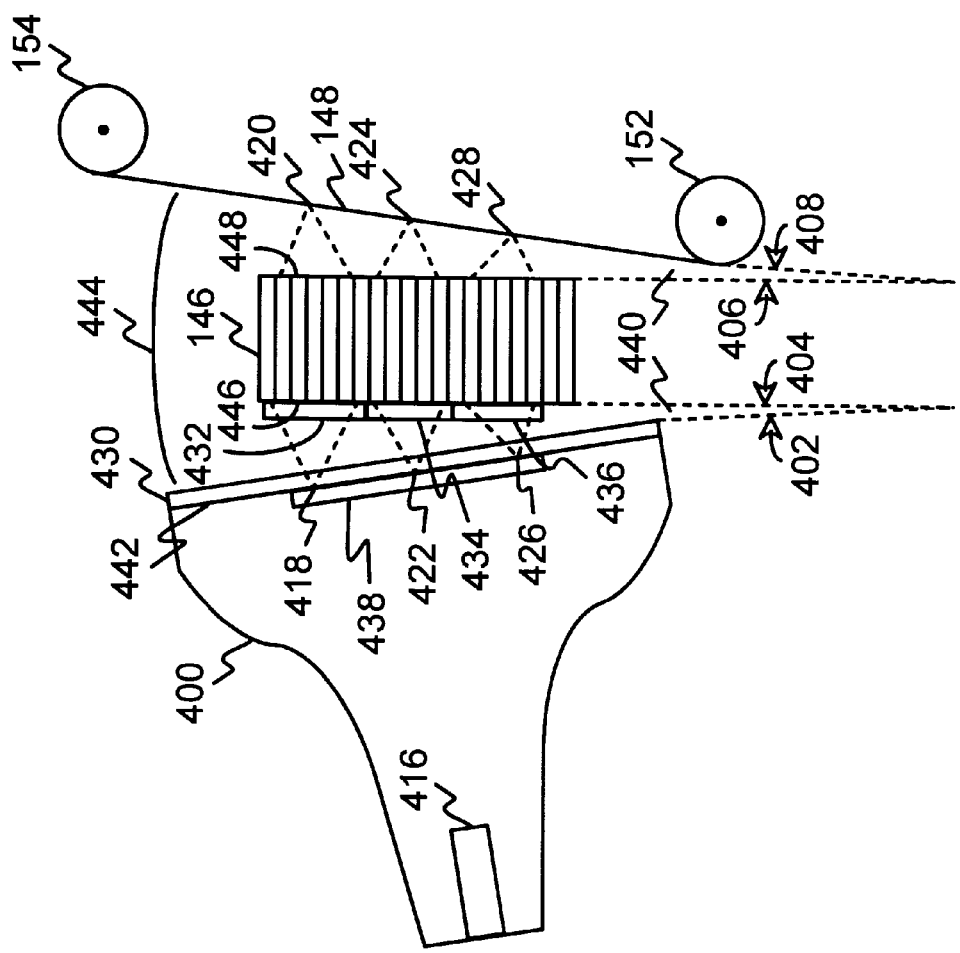
FIG. 4 shows a second embodiment of the present invention wherein the face of the CRT is angled with respect to the media and further wherein a broad wavelength band phosphor is present on the inside surface of the face of the CRT and color filters are present on the outside surface of the face of the CRT.

FIG. 4 shows a second embodiment of the present invention wherein color filters are placed outside the face of the CRT. Referring to FIG. 4, a CRT 400 is shown having an electron gun 416 used to activate white phosphor 438 on a face 430 of the CRT 400. A red filter 432 is shown located on an outside surface of the face 430 of the CRT 400 to filter out all but red light. Similarly green filter 434 and blue filter 436 are also located on the outside surface of the CRT 400. Locating the filters 432, 434 and 436 anywhere outside the surface of the CRT face 430 allows the use of white phosphor at all locations within the CRT 400, thus reducing cost.

A line 402 extends from the surface 430 of the CRT 400 and a line 404 extends from an inside surface 446 of the graded index lens array 146. Similarly, a line 406 extends from the outside surface 448 of the graded index lens array 146 and a line 408 extends from the surface of the media 148. The angle 444 between lines 402 and 408 is chosen such that the TC is optimal for the red light emitted from a point 418 on the surface 430, as filtered by the filter 432, and impacting the media at point 420; the TC is optimal for the green light emitted from a point 422 on the surface 430, as filtered by the filter 434, and impacting the media at point 424; and the TC is optimal for the blue light emitted from a point 426 on the surface 430, as filtered by the filter 436, to impact the media at point 428. In the present invention, this angle is also approximately 4.38 degrees.

The angles are the same both for the embodiment of FIG. 3 and the embodiment of FIG. 4, since the TC is determined from the point of origin of the light, which is the same for both embodiments.

Placing the graded index lens array 146 at the center of the angle 434 causes the light to travel through the same distance between the face 430 of the CRT and the inside surface 436 of the graded index lens array 146 as the light travels between the outside surface of the graded index lens and the media 148.

Those skilled in the art will recognize that the filters 432, 434 and 436 could also be placed on the inside surface 446 of the graded index lens array 146, or placed on the outside surface 448 of the graded index lens array 146, or placed adjacent to the media 148.

In a similar manner, the embodiments of FIGS. 3 and 4 could be combined by using different phosphors to create the red, green, and blue light, but also utilizing color filters to refine the quality of the colors before the light strikes the media.

Figure 5:
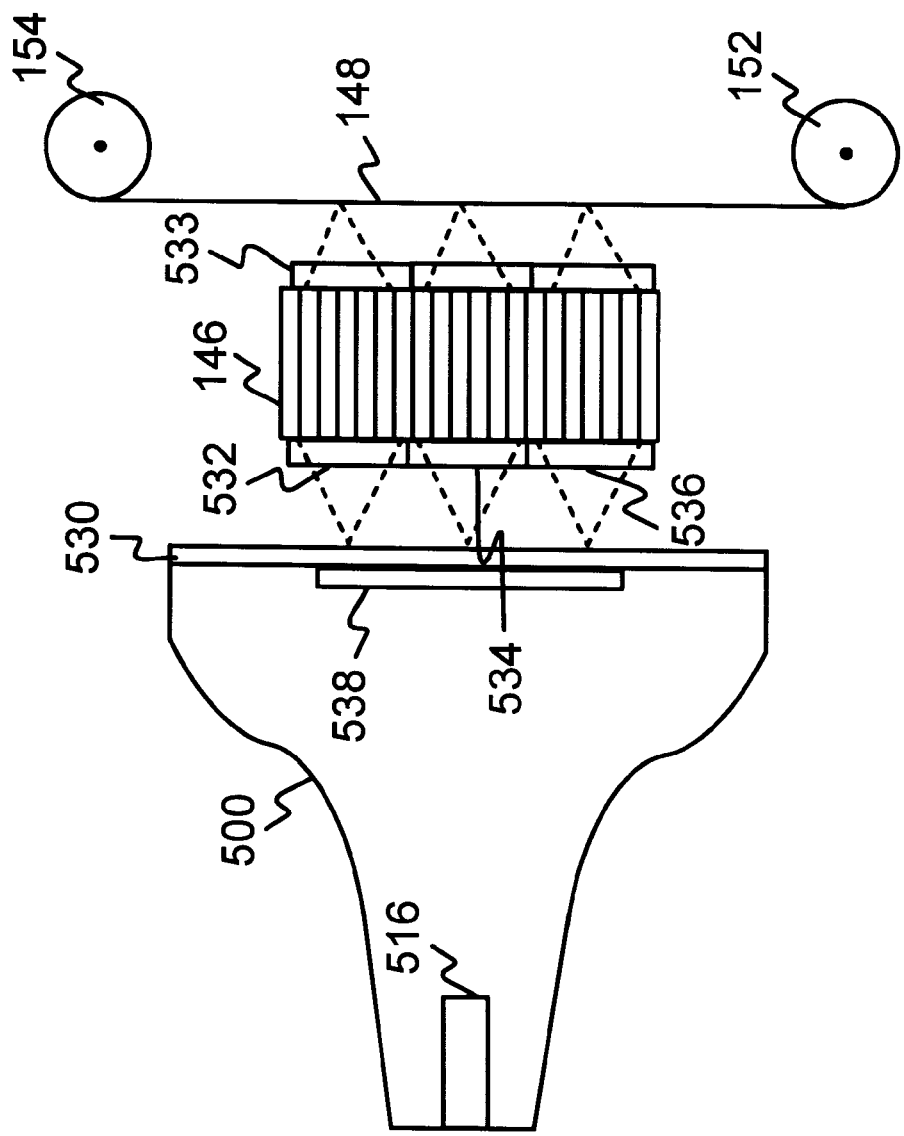
FIG. 5 shows a third embodiment of the present invention wherein the face of the CRT is parallel to the media and wherein each color filter present on the outside surface of the face of the CRT has a different Index of refraction or thickness to adjust the TC for the color being filtered.

FIG. 5 shows a third embodiment of the present invention wherein color filters placed outside the face of the CRT are made of different materials to compensate for the chromatic aberration of the graded index lens array. Referring to FIG. 5, a CRT 500 is shown having an electron gun 516 used to activate white phosphor 538 on a face 530 of the CRT 500. A red filter 532 is shown located on an outside surface of the face 530 of the CRT 500 to filter out all but red light. Similarly green filter 534 and blue filter 536 are also located on the outside surface of the CRT 500. Locating the filters 532, 534 and 536 on the outside surface of the CRT face 530 allows the use of white phosphor at all locations within the CRT 500, thus reducing cost.

To create the optimal Total Conjugate (TC) for each color of light, the red filter 532, the green filter 534 and the blue filter 536 are made of different materials, each having a different index of refraction, or are made of the same materials but different thicknesses, which conduct light at different speeds. Thus filter 532 is selected of a material that conducts light at a speed necessary to create an effective TC of 38.25 mm, filter 534 is selected of a material that conducts light at a speed necessary to create an effective TC of 37.9 mm, and blue filter 536 is selected of a material that conducts light at a speed necessary to create an effective TC of 37.5 mm. Alternatively, the distance between the CRT face 530 and the media can be selected to eliminate the need for special filter material in one of the filters 532, 534 or 536, and the material in the other two filters adjusted to create the necessary TC values.

A third alternative, not shown, is to select the same material for the filters, but add other light conducting material between each filter and the graded lens array 146 to create the necessary TC for each of the light wavelengths.

Figure 6:
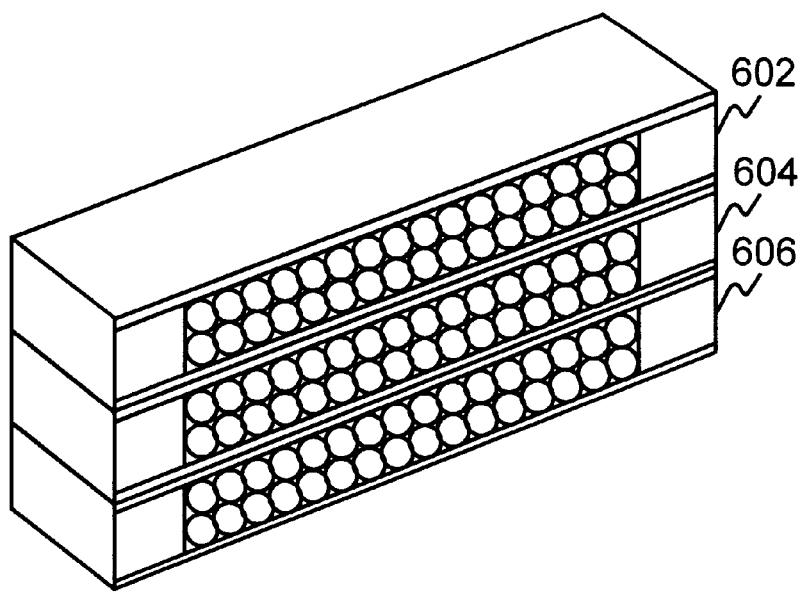
FIG. 6 shows one embodiment of the graded index lens array of the present invention wherein three lens arrays are used in combination to conduct an image.

FIG. 6 shows one embodiment of the graded index lens array 146 (FIG. 1). Referring to FIG. 6, three separate graded index arrays 602, 604, and 606 are shown. Each of the arrays 602, 604, and 606 is used to conduct one of the colors red, green, and blue. This embodiment allows the lengths of each of the graded index arrays to be tailored to the wavelength of the light being conducted by the array. In this manner, the distance between the CRT and the media is determined by the lengths of the graded index arrays.

Figure 7:
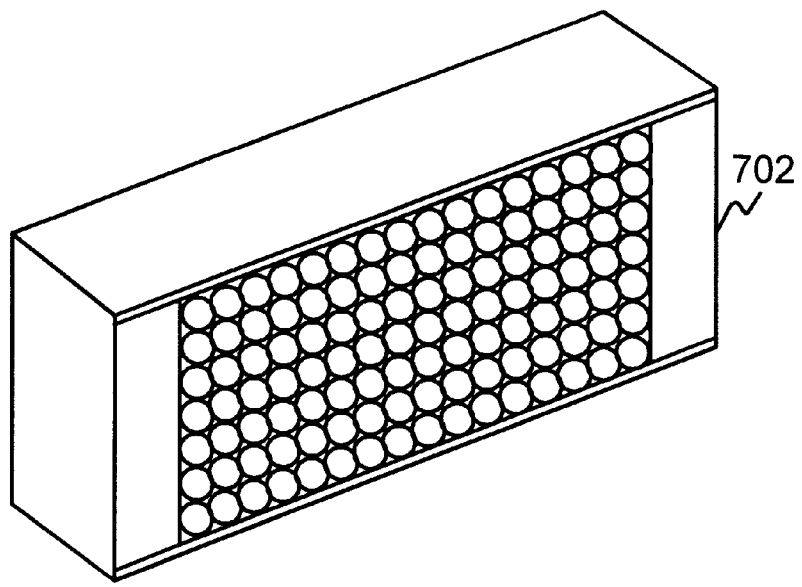
FIG. 7 shows a second embodiment of the graded index lens array of the present invention wherein a single lens array is used to conduct an image.

FIG. 7 shows a second embodiment of the graded index lens array 146 (FIG. 1). Referring to FIG. 7, a single array 702 is used to conduct light from all three colors to the media.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A printer for printing a digital image onto photosensitive media, said printer comprising:

an interface for receiving said digital image from an image source;

a storage device connected to receive said digital image from said interface and for storing said image;

an image illumination device connected to said storage device for displaying elements of said digital image on a surface of said image illumination device;

a controller for directing said elements of said digital image to said image illumination device to display said elements of said digital image on said surface of said image illumination device;

a color selection system for displaying a plurality of color components contained within said elements of said digital image at selected locations on said surface of said image illumination device;

a graded index lens array mounted between said surface of said image illumination device and said photosensitive media, said graded index lens array for conducting said elements of said digital image displayed on said surface of said image illumination device to said media;

a movement device for exposing each line of said media to a predetermined number of said elements of said digital image displayed on said surface of said image illumination device and a chromatic aberration compensation system for changing a total conjugate between said CRT and said media for each color component comprising mounting said image illumination device at an angle greater than zero between a face of said image illumination device and said photosensitive media wherein said angle is selected to provide a predetermined total conjugate for at least two of said color components.

2. The printer of claim 1 wherein said image illumination device and said color selection system comprises a plurality of phosphor stripes on a surface of said CRT, one phosphor stripe for each color component of said digital image.

3. The printer of claim 1 wherein said image illumination device and said color selection system comprises a plurality of color filters placed between a CRT and said media, one color filter for each color component of said digital image.

4. The printer of claim 3 wherein said array of lenses comprises a plurality of arrays, one array for each color component.

5. The printer of claim 2 wherein said array of lenses comprises a plurality of arrays, one array for each color component.

6. The printer of claim 1 further comprising:

at least one color filter mounted between a surface of said image illumination device and said media, wherein each of said at least one color filter is constructed of a material to allow a predetermined total conjugate for a color of light being filtered by said at least one color filter.

7. The printer of claim 1 wherein said chromatic aberration compensation system comprises:

mounting said image illumination device at an angle greater than zero between a face of said image illumination device and said photosensitive media, wherein said angle is selected to provide a predetermined total conjugate for at least one of said color components;

an optical element mounted between said image illumination device and said media for each color component of said digital image not compensated for by said angle, wherein said optical element is constructed of a material to allow a predetermined total conjugate for a color of light being filtered by said color filter.

8. A method for printing a digital image onto photosensitive media, said method comprising the steps of:
(a) receiving said digital image from an image source;
(b) storing said image received in step (a);
(c) displaying elements of said digital image stored in step (b) on a surface of an image illumination device comprising displaying a plurality of color components contained within said elements of said digital image at selected locations on said surface of said image illumination device;
(d) conducting said elements of said digital image displayed on said surface of said image illumination device to said media through a graded index lens array mounted between said surface of said image illumination device and said photosensitive media and further conducting at least one color component of said elements from a face of said image illumination device to said photosensitive media through a first total conjugate and conducting at least one other color component of said elements from a face of said image illumination device to said photosensitive media through a second total conjugate different from said first total conjugate, wherein said difference between said first and said second total conjugate distances are created by varying a density of material between said image illumination device and said photosensitive media; and
(e) exposing each line of said media to a predetermined number of said elements of said digital image displayed on said surface of said image illumination device.

9. The method of claim 8 wherein step (c) further comprises displaying each of said color components in a phosphor stripe on a surface of a CRT.

10. The method of claim 9 wherein said array of lenses comprises a plurality of arrays, one array for each color component.

11. The method of claim 8 wherein step (c) further comprises displaying each of said color components on an area of said image illumination device adjacent a color filter.

12. The method of claim 11 wherein said graded index lens comprises an array of lenses.

13. The method of claim 12 wherein said array of lenses comprises a plurality of arrays, one array for each color component.

14. The method of claim 8 wherein step (d) further comprises conducting said elements through a chromatic aberration compensation system for changing a total conjugate between said image illumination device and said media for each color component.

15. The method of claim 11 wherein difference between said first and said second conjugate distances are created by varying an index of refraction of material between said image illumination device and said photosensitive media.

16. The method of claim 11 wherein difference between said first and said second conjugate distances are created by varying a thickness material between said image illumination device and said photosensitive media.

17. A method for compensating for chromatic aberration in an imaging system having a graded index lens, said method comprising the steps of:

(a) displaying elements of said image on a surface of an image illumination device;
(b) conducting said elements of said image from said surface of said illumination device to said media through said graded index lens array mounted between said surface of said image illumination device and said photosensitive media; and
(c) further conducting said image from said surface of said illumination device to said media through a chromatic aberration compensation system for changing a total conjugate between said surface of said image illumination device and said media for each color component, wherein said chromatic aberration compensation system comprises placing optical elements having varying a densities of material between said image illumination device and said photosensitive media.

18. The method of claim 17 wherein said chromatic aberration compensation system comprises mounting said image illumination device at an acute angle to said media and further mounting said graded index lens array at an optical center of said acute angle.

19. The method of claim 17 wherein said chromatic aberration compensation system comprises placing optical elements having varying indices of refraction between said image illumination device and said photosensitive media.

20. The method of claim 17 wherein said chromatic aberration compensation system comprises placing optical elements having varying thicknesses of at least one type of material between said image illumination device and said photosensitive media, one optical element for each color component within said image.

21. A printer for printing a digital image onto photosensitive media, said printer comprising:
an interface for receiving said digital image from an image source;
a storage device connected to receive said digital image from said interface and for storing said image;
a CRT connected to said storage device for displaying elements of said digital image on a surface of said CRT;
a controller for directing said elements of said digital image to said CRT to display said elements of said digital image on said surface of said CRT;
a color selection system for displaying a plurality of color components contained within said elements of said digital image at selected locations on said surface of said CRT;
a graded index lens array mounted between said surface of said CRT and said photosensitive media, said graded index lens array for conducting said elements of said digital image displayed on said surface of said CRT to said media;
a movement device for exposing each line of said media to a predetermined number of said elements of said digital image displayed on said surface of said CRT; and
a chromatic aberration compensation system for changing a total conjugate between said CRT and said media for each color component wherein said chromatic aberration compensation system comprises mounting said CRT at an angle greater than zero between a face of said CRT and said photosensitive media, wherein said angle is selected to provide a predetermined total conjugate for at least two of said color components.

22. The printer of claim 21 wherein said CRT and said color selection system comprises a plurality of phosphor stripes on a surface of said CRT, one phosphor stripe for each color component of said digital image.

23. The printer of claim 21 wherein said CRT and said color selection system comprises a plurality of color filters placed between said CRT and said media, one color filter for each color component of said digital image.

24. The printer of claim 23 wherein said array of lenses comprises a plurality of arrays, one array for each color component.

25. The printer of claim 22 wherein said array of lenses comprises a plurality of arrays, one array for each color component.

26. The printer of claim 20 further comprising:

at least one color filter mounted between a surface of said CRT and said media, wherein each of said at least one color filter is constructed of a material to allow a predetermined total conjugate for a color of light being filtered by said at least one color filter.

27. The printer of claim 21 wherein said chromatic aberration compensation system comprises:

mounting said CRT at an angle greater than zero between a face of said CRT and said photosensitive media, wherein said angle is selected to provide a predetermined total conjugate for at least one of said color components;

an optical element mounted between said CRT and said media for each color component of said digital image not compensated for by said angle, wherein said optical element is constructed of a material to allow a predetermined total conjugate for a color of light being filtered by said color filter.

* * * * *